United States Patent
Yates (10) Patent No.: US 12,306,842 B1
(45) Date of Patent: May 20, 2025

(54) WITHIN-CONTEXT SEMANTIC RELEVANCE INFERENCE OF MACHINE LEARNING MODEL GENERATED OUTPUT

(71) Applicant: Promoted.ai, Inc., San Francisco, CA (US)

(72) Inventor: Andrew Donald Yates, San Francisco, CA (US)

(73) Assignee: Promoted.ai, Inc., San Francisco, CA (US)

( * ) Notice: Subject to any disclaimer, the term of this patent is extended or adjusted under 35 U.S.C. 154(b) by 0 days.

(21) Appl. No.: 18/943,304

(22) Filed: Nov. 11, 2024

Related U.S. Application Data (60) Provisional application No. 63/666,336, filed on Jul. 1, 2024.

(51) Int. Cl.
*G06F 16/2457* (2019.01)
*G06N 20/00* (2019.01)

(52) U.S. Cl.
CPC ....... *G06F 16/24578* (2019.01); *G06N 20/00* (2019.01)

(58) Field of Classification Search
CPC .......... G06F 16/24578; G06F 16/9538; G06F 16/248; G06F 16/3329; G06F 16/3347; G06N 20/00; G06N 3/091; G06N 3/0475; G06N 5/02
See application file for complete search history.

(56) References Cited

U.S. PATENT DOCUMENTS

| | | |
|---|---|---|
| 2005/0065959 A1 | 3/2005 | Smith et al. |
| 2007/0192300 A1 | 8/2007 | Reuther et al. |
| 2011/0191327 A1 | 8/2011 | Lee |
| 2015/0046281 A1 | 2/2015 | Shivaswamy et al. |
| 2020/0104305 A1* | 4/2020 | Wei ..................... G06F 16/9535 |
| 2020/0242144 A1 | 7/2020 | Yoshida et al. |
| 2021/0334886 A1 | 10/2021 | Clark et al. |
| 2023/0316006 A1 | 10/2023 | Tunstall-Pedoe et al. |
| 2024/0232199 A1 | 7/2024 | Hambardzumyan et al. |
| 2024/0256582 A1 | 8/2024 | Jain et al. |
| 2024/0256622 A1 | 8/2024 | Abrams et al. |

(Continued)

OTHER PUBLICATIONS

Pierce, David. "The AI takeover of Google Search starts now." May 10, 2023. 13 pages. https://www.theverge.com/2023/5/10/23717120/google-search-ai-results-generated-experience-io (Year: 2023).

*Primary Examiner* — Hau H Hoang
(74) *Attorney, Agent, or Firm* — Cognition IP, P.C.; Edward Steakley (57) ABSTRACT

Methods and systems provide content searching and retrieval using generative artificial intelligence (AI) Models. The system is configured to receive a user search for content, media or item listings. The system receives a natural language-based input associated with a client device of a user. The system generates a search criterion for the received natural language-based input. The system, via the generative AI-bases search and retrieval system, generates a relevancy-ranked output listing of content items. The relevancy-ranked output listing content items responsive to the generated search criterion content items having an associated content identifier and a content description. The system causes portions of the relevancy-ranked output listing to be rendered at the client device of the user.

15 Claims, 9 Drawing Sheets

(56) References Cited

U.S. PATENT DOCUMENTS

2024/0289407 A1  8/2024  Rofouei et al.
2024/0394512 A1  11/2024  Cunningham et al.
2024/0403373 A1* 12/2024  Chao .................. G06F 16/9538

* cited by examiner

| 400 Content Name | Content Relevance Ranking | Request Retrieval Score | Other Content Item Data |
|---|---|---|---|
| Content item 1 | 4 | 13.67 | Content item data |
| Content item 2 | 3 | 23.87 | Content item data |
| Content item 3 | 3.5 | 13.86 | Content item data |
| Content item 4 | 2 | 17.41 | Content item data |
| Content item 5 | 4 | 56.02 | Content item data |
| Content item 6 | 4 | 22.95 | Content item data |
| Content item 7 | 3 | 11.16 | Content item data |
| Content item 8 | 3 | 23.63 | Content item data |
| Content item 9 | 4 | 25.11 | Content item data |
| Content item 10 | 2.5 | 31.38 | Content item data |
| Content item 11 | 2.5 | 21.66 | Content item data |

FIG. 4

| Content Relevance | Relevance Description | 500 Description |
|---|---|---|
| 1 | Irrelevant | No connection or relevance; likely a mismatch, or an error. |
| 2 | Slightly Relevant | Minimal connection. |
| 3 | Moderately Relevant | A broad match, but not a good match. |
| 4 | Highly Relevant | A good match with substantial related information; however, inconsistencies, incomplete information, or a lack of supporting details require a cautious approach to fully endorsing the relevance claimed or a perfect match with the query. |
| 5 | Exactly Relevant | A perfect match. Clear, consistent evidence throughout the profile supports the expertise. |

WITHIN-CONTEXT SEMANTIC RELEVANCE INFERENCE OF MACHINE LEARNING MODEL GENERATED OUTPUT

CROSS-REFERENCE TO RELATED APPLICATIONS

This application claims the benefit of priority to U.S. Provisional Application No. 63/666,336, filed on Jul. 1, 2024, which is hereby incorporated by reference in its entirety.

FIELD OF INVENTION

Various embodiments relate generally to analysis of machine learning model operations, and more particularly, to systems and methods for within-context semantic relevance inference of machine learning model generated output.

SUMMARY

Methods, systems, and apparatus, including computer programs encoded on computer storage media relate to methods for within-context semantic relevance inference of machine learning model generated output.

In some embodiments, the system performs search and retrieval of content items based on an input for search criteria from a client device. A generative AI-based search retrieval system is used to retrieve content that is relevant to the received search criteria. The system creates a relevancy ranking value for each of content items that are retrieved from one more datastores. A retraining process of one or more machine learning modes is employed to adjust the relevant content items retrieved for subsequent searches performed by the generative AI-based search and retrieval system.

In some embodiments, the system receives a natural language-based input associated with a client device of a user. The system generates a search criterion for the received natural language-based input. The system, via the generative AI-bases search and retrieval system, generates a relevancy-ranked output listing of content items. The relevancy-ranked output listing content items responsive to the generated search criterion content items having an associated content identifier and a content description. The system causes portions of the relevancy-ranked output listing to be rendered at the client device of the user. The system generates a search summary indicating content item identifiers, content descriptions and an associated relevancy ranking value of the content items associated with the generated relevancy-ranked output.

In some embodiments, the system performs a process of machine learning model retraining using adjustments made to the relevancy ranking values of the content items with regard to the performed search. The machine learning model is trained and the republished for use for subsequent searches and retrieval of content items response to received search criteria.

The examples and appended claims may serve as a summary of this application.

BRIEF DESCRIPTION OF THE DRAWINGS

The present invention relates generally to content generation, and more particularly, to systems and methods for providing rich media presentation of recommendations in generative media.

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Further areas of applicability of the present disclosure will become apparent from the remainder of the detailed description, the claims, and the drawings. The detailed description and specific examples are intended for illustration only and are not intended to limit the scope of the disclosure.

Figure 1A:
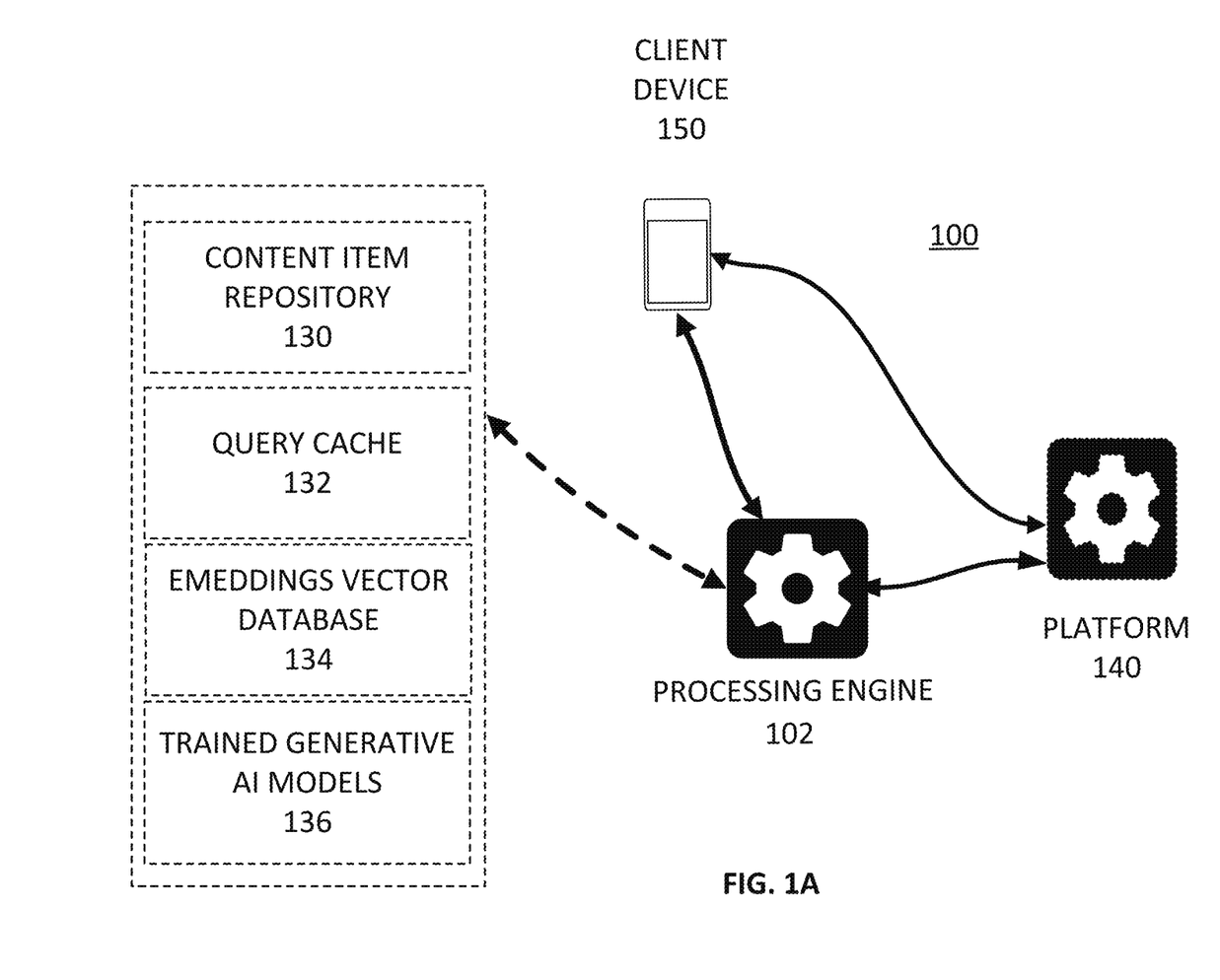
FIG. 1A is a diagram illustrating an exemplary environment in which some embodiments may operate.

FIG. 1A is a diagram illustrating an exemplary environment in which some embodiments may operate. In the exemplary environment 100, a client device 150, and a platform 140 are connected to a processing engine 102. The processing engine 102 is optionally connected to one or more repositories and/or databases. Such repositories and/or databases may include, for example, a content item repository 130, a query cache 132, embeddings vector database 134, and trained generative AI models 136, such as one or more foundation generative AI models and domain refined generative AI models. One or more of such repositories may be combined or split into multiple repositories. The client device 150 in this environment may be a computer, and the platform 140 and processing engine 102 may be, in whole or in part, applications or software hosted on a computer or multiple computers which are communicatively coupled via remote server or locally. In some embodiments, the embeddings vector database 134 includes at least one or more of the following: query embeddings which are historic embeddings associated with a prior user query; vector embeddings generated by the trained generative AI models; real product item listing embeddings; real document embeddings. Each of the embeddings in Vector database 134 may have an embedding type such as an image, text, multiple, etc.

The exemplary environment 100 is illustrated with only one client device, one processing engine, and one platform, though in practice there may be more or fewer additional client devices, processing engines, and/or platforms. In some embodiments, the client device, processing engine, and/or platform may be part of the same computer or device.

Figure 2A:
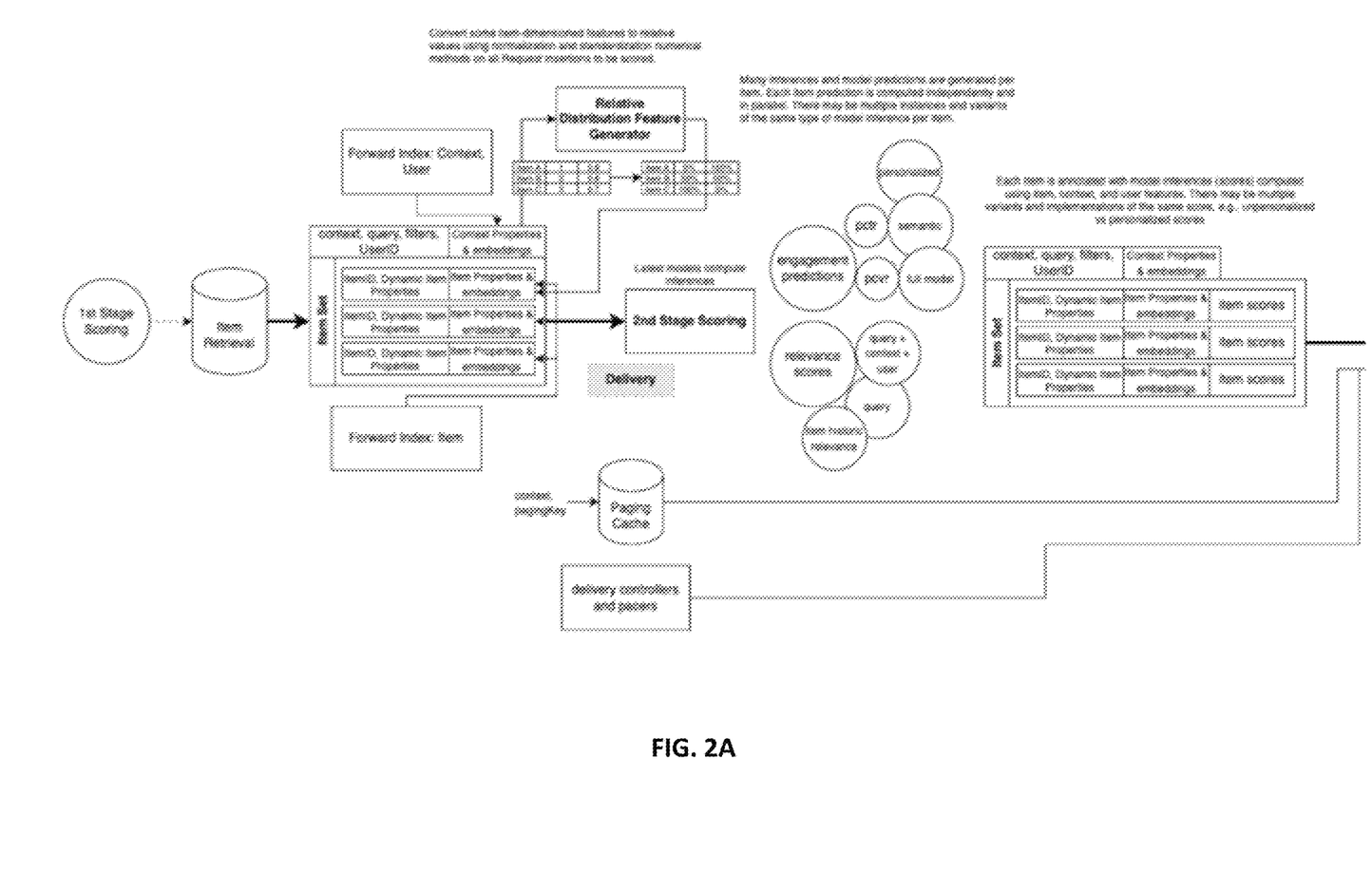
FIGS. 2A-2B is a diagram illustrating an exemplary method describing a multi-stage scoring process to determine relevant content items for retrieval using an exemplary computer system.
Figure 2B:
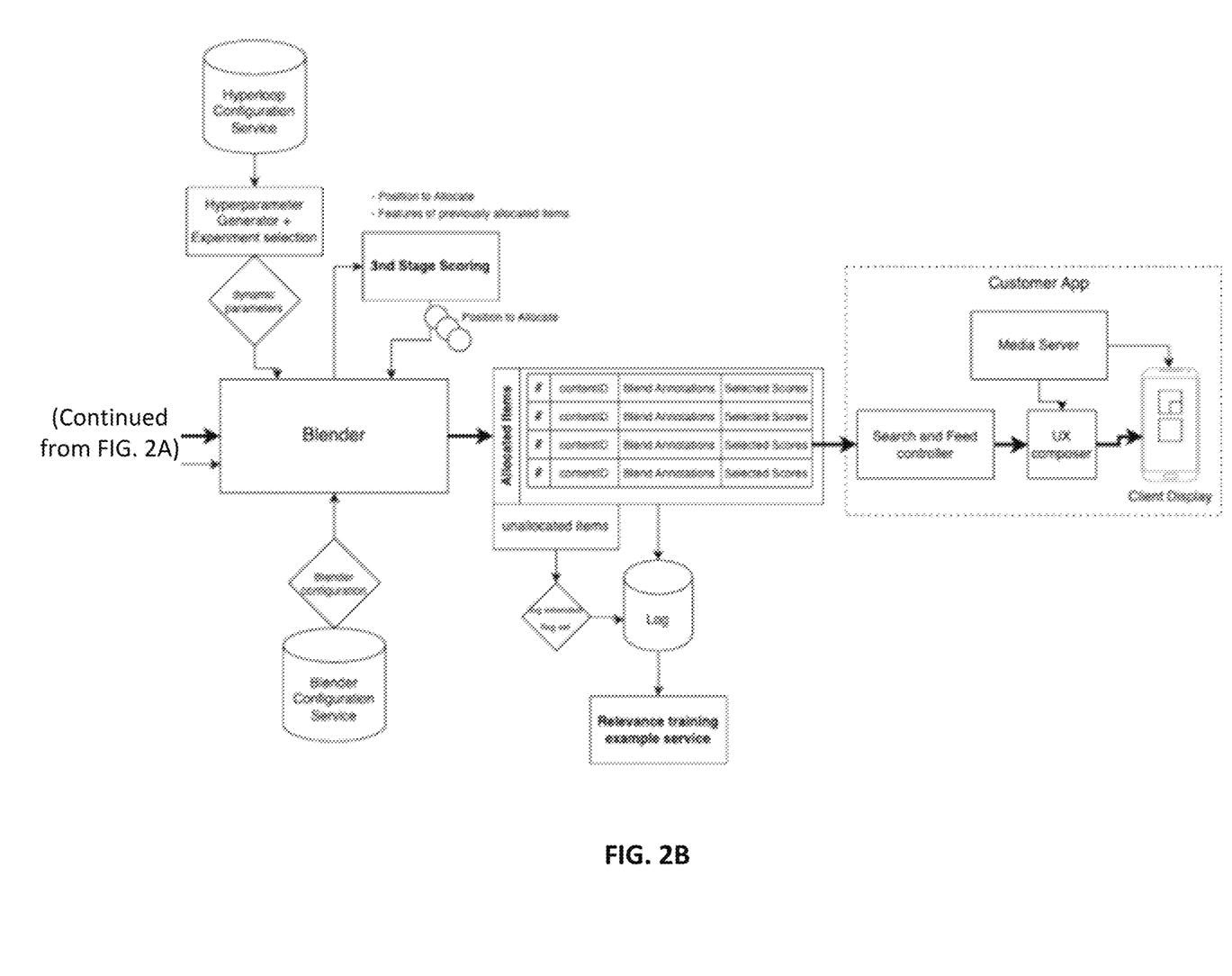

In an embodiment, the processing engine 102 may perform the method 200 (FIG. 2) or other method herein and, as a result, provide for rich media presentation of recommendations in generative media. In some embodiments, this may be accomplished via communication with the client device, additional client device(s), processing engine 102, platform 140, and/or other device(s) over a network between the device(s) and an application server or some other network server. In some embodiments, one or both of the processing engine 102 and platform 140 may be an application, browser extension, or other piece of software hosted on a computer or similar device, or in itself a computer or similar device configured to host an application, browser extension, or other piece of software to perform some of the methods and embodiments herein.

In some embodiments, the processing engine 102 performs processing tasks partially or entirely on the client device 102 in a manner that is local to the device and relies on the device's local processor and capabilities. In some embodiments, the processing engine 102 may perform processing tasks in a manner such that some specific processing tasks are performed locally, such as, user interface processing tasks, while other processing tasks are performed remotely via one or more connected servers, such as, media or content search and retrieval tasks. In yet other embodiments, the processing engine 102 may processing tasks entirely remotely.

In some embodiments, client device 150 may be a device with a display configured to present information to a user of the device. In some embodiments, the client device 150 presents information in the form of a user interface (UI) with UI elements or components. In some embodiments, the client device 150 sends and receives signals and/or information to the processing engine 102 pertaining to the platform. In some embodiments, client device 150 is a computer device capable of hosting and executing one or more applications or other programs capable of sending and/or receiving information. In some embodiments, the client device 150 may be a computer desktop or laptop, mobile phone, virtual assistant, virtual reality or augmented reality device, wearable, or any other suitable device capable of sending and receiving information. In some embodiments, the processing engine 102 and/or platform 140 may be hosted in whole or in part as an application or web service executed on the client device 150. In some embodiments, one or more of the platform 140, processing engine 102, and client device 150 may be the same device. In some embodiments, the platform 140 and/or the client device 150 are associated with one or more particular user accounts.

Figure 1B:
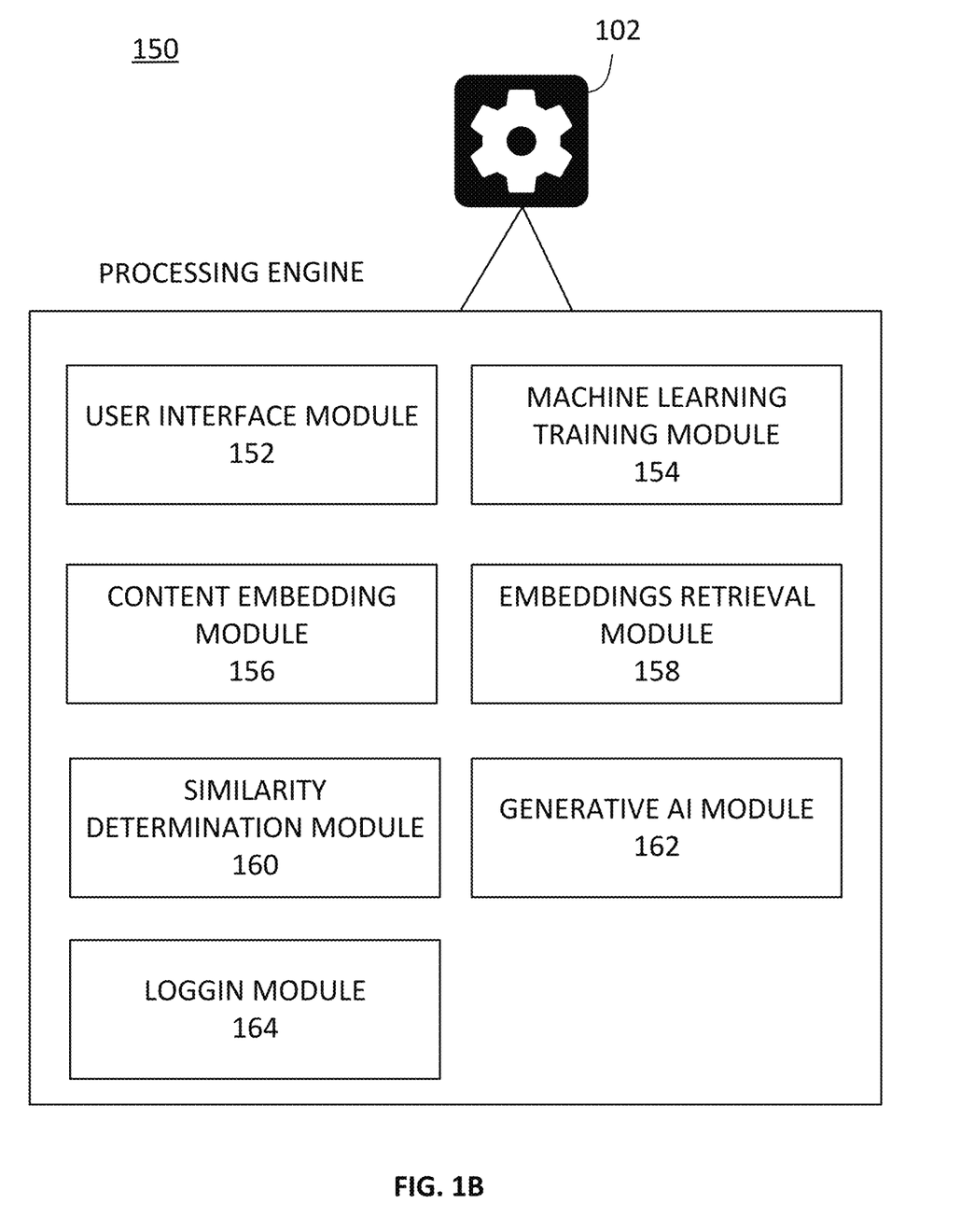
FIG. 1B is a diagram illustrating an exemplary computer system that may execute instructions to perform some of the methods herein.

FIG. 1B is a diagram illustrating an exemplary computer system 150 with software modules that may execute some of the functionality described herein. In some embodiments, the modules illustrated are components of the processing engine 102.

User interface module 152 functions to receive a user input of a search query and display the results of the search query via a user interface of the client device.

The machine learning training module 154 functions to train one mor more machine learning models of the search and retrieval system.

The content embedding module 156 obtains information about real listing of items, such as images, text and/or multimedia, and generates embeddings and stores the information in a vector database.

The embeddings retrieval module 158 obtains embedding information based on an identifier, such as an item identifier, a user identifier, a query identifier or a combination thereof.

The similarity determination module 160 determines a similarity and generates a similarity score based on a type and an identifier. The system searches a vector database that has stored embedding information related to text, images and multimedia. The module determines similarity of one or more embeddings of the content item listings generated from the one or more generative AI models with one or more embeddings for real product items, real documents or other embeddings stored in the vector database.

The generative AI module 162 receives a search query via a prompter to perform a search via one or more generative AI models. The generative AI models may include a primary general generative AI model and one or more domain specific generative AI models.

The logging module 164 generates one or more logs of describing content items returned relevant to a search query.

In some embodiments, the system uses training examples that are generated from sampled live delivery logs of sets of items considered for allocation with relevance labels generated either by human reviews, LLMs, or both. These labels can be used in lieu of the inferred labels for use in allocation decisions. Where some current system relevance ranker systems return "relative" relevance ranking scores that are only meaningful in relationship to other potentially more or less relevant items to a query. However, these scores must be converted to "absolute" relevance scores for use in composite allocation systems with other factors like such as objective maximization and absolute judgements of relevance like trimmers. As such, there is a need to convert relative and subjective measures like relative similarity score rankings within a result set and number of keyword matches into judgments like the "expected relevance label for this item in this context." This system does that.

In some embodiments, the system provides functionality for in-context machine learning feature logging of allocation request. The system performs, via one or more processors of the system performs operations for the logging of and analysis of information related to a query and machine learning model generated output. In some operations, the system performs the logging of query, query context (if any) including search filters and clarifying options and conversational feedback. Alternatively, the "query" may be user preferences explicitly defined by the user or inferred from past history. The system performs operations that analyze aspects of user search queries and results generated by one more machine learning models of the system.

The system may log item information useful for understanding what that item is and its evaluation by users for suitability in a search, recommendation, or ads system; any generated machine learning features derived from the above; and/or any generated machine learning features derived from the relative distribution of features with a per-item dimension as per above. For example, a percentile of a query and item similarity score for all items considered for an allocation from a search and delivery retrieval system in the target application domain Additionally, the system may log any existing "semantic contextual relevance" relevance labels for this item in this context at this time, for example, (query, item), (query, filters, item), (user preferences, item), (user history, user preferences, item), (query, user preferences, item).

Also, any inferences of such relevance labels generated by machine learning models.

For example, the system may evaluate machine learning model generated output, such as:

<query: "cat food", item: "My expensive cat food", relevance: 5:exact match>

<query: "cat food", item: "dog food A", relevance: 2:weak match>

<query: "cat food", item: "wool blanket", relevance: 1:no match>

<query: "cat food", queryContext: "chicken, order by lowest cost", item; "My expensive cat food", relevance 4: strong match>

<userPreference: "horror", userHistory: ["scream, 1 month ago" ], query: "die", item "Truth or Die", relevance: 4: strong match>

<userPreference: "horror", userHistory: ["scream, 1 month ago" ], query: "die", item "Die Hard", relevance: 3: moderate match>

<userPreference: "action", userHistory: ["Goldeneye, 2 months ago"], query: "die", item "Truth or Die", relevance: 3: moderate match>

<userPreference: "action", userHistory: ["Goldeneye, 2 months ago"], query: "die", item "Die Hard", relevance: 4: strong match>

FIGS. 2A-2B are a system diagram illustrating a content retrieval system. The diagram provides an overview of data flow in the system. The content retrieval system provides functionality for a multistage ranking (i.e. scoring) process for the selection of data and content for retrieval. Request insertions flow from a 1st stage ranker retrieval system. Additional information about the user, context, and the set of content items represented by the request insertions are fetched from other services are assembled, may be transformed into distribution features, and then are sent to 2nd stage ranking process for the generation of a variety of scores generated as output from different machine learning models. These sets of scores are attached to each request insertion (referred to as execution insertions) and sent to blender process.

The blender process generates an allocation of content items. A 3rd stage scoring process may be performed by the system which re-scores the allocation of content items per each content item allocated to machine learning model interactions between content items and allocation position placements. The blender process outputs final annotated insertions which are assembled into an allocation, referred to as response insertions, along with a subset of additional annotations of the type of content item. Response insertions, without features or scores except the additional annotations, are sent to the end user display system for presentation to an end user.

The full insertions, including all features and scores, are logged for future training use. In some embodiments, Typically, only Response insertions are logged with all features, but if a flag is set, then a random set of non-allocated Execution Insertions are also logged for use in relevance model training and analytics.

Figure 3:
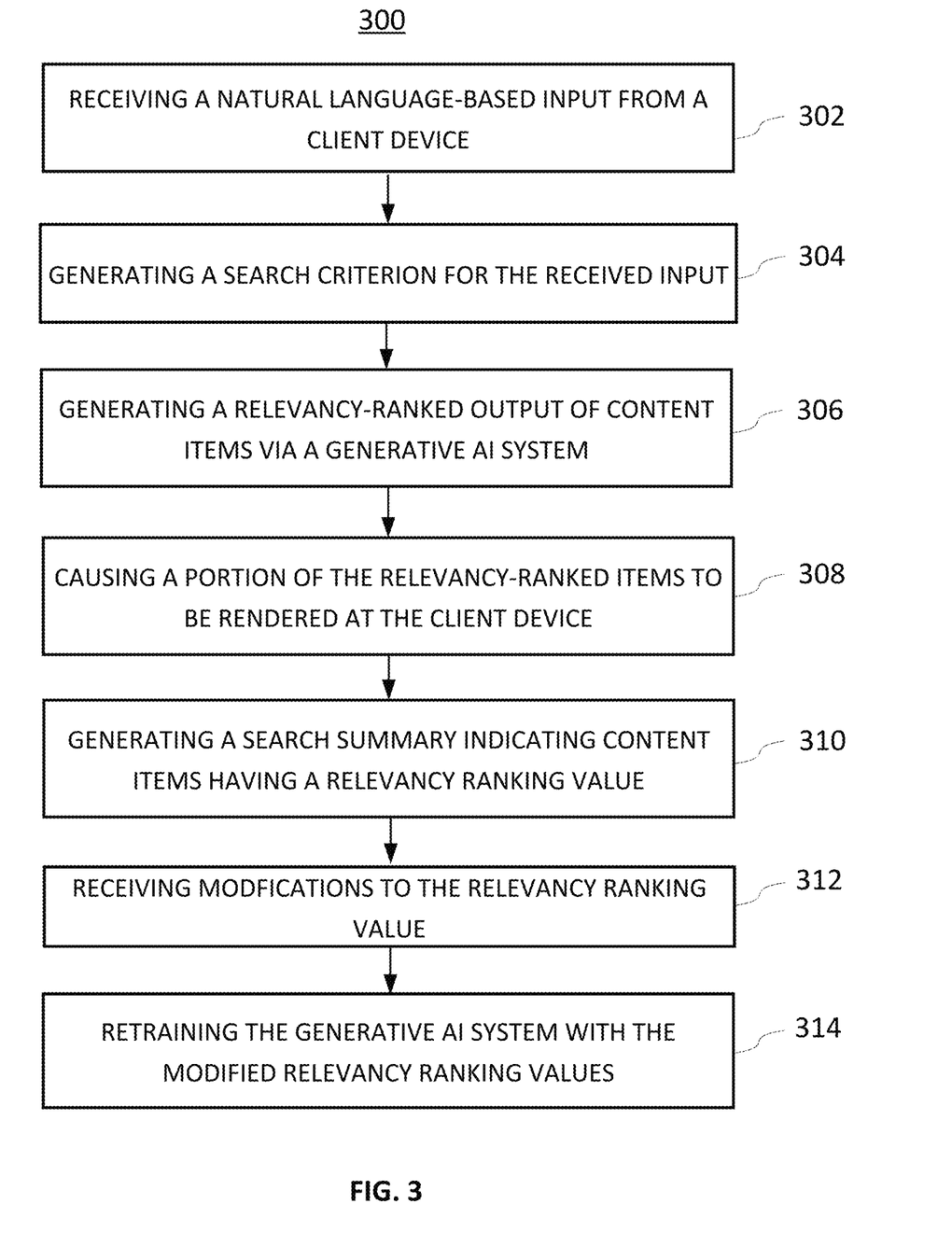
FIG. 3 is a flow chart illustrating an exemplary method that may be performed in some embodiments.

FIG. 3 is a flow chart illustrating an exemplary method 300 that may be performed in some embodiments. The method 300 may be performed by one or more processors and describes aspects of the system depicted in FIGS. 2A-2B.

In step 302, the system receives a natural language-based input from a client device. For example, a user may enter into a user interface one or more textual inputs or speech-to-text converted inputs.

In step 304, the system generates a search criterion for the received natural-based input. In some embodiments, the system evaluates the received input and generates a search criterion using the context of the language of the search.

In step 306, the system generates relevancy-ranked output of content items. In some embodiments, the system performs a multiple step process that includes:

(1) causing the generated search criterion to be processed, via a generative AI search system, comprising one more machine learning models; and (2) generating by the generative AI search system, a relevancy-ranked output listing content items responsive to the generated search criterion, wherein the content items have a content identifier and a content description.

In some embodiments, the generative AI search system performs, by the one or more processors, a search process to identify a set of content items responsive the search criterion. For example, the system generates search vector embeddings of the search criterion and performs a search using the vector embedding. The generative AI search system then performs a vector similarity matching of the search vector embedding as to a set of vector embeddings describing the content items. The generative AI search system then generates a listing of those content items where a similarity threshold match value is met or exceeded. The similarity threshold may be a predetermined value where a similarity score must match or exceed the predetermined value to determine that a particular content item is responsive to the generated search criterion.

In some embodiments, the generative AI search system performs, by the one or more processors, a first stage scoring process to generate a set of content items, and performs a second stage scoring process, by processing the set of content items by an inferencing machine learning model trained to determine item score values. The system executes the inferencing machine learning model which determines item score values for the set of content items.

In some embodiments, the generative AI search system performs, by the one or more processors, a third stage scoring process that modifies an item score value to adjust a content item position placement in the relevancy-ranked output listing.

In some embodiments, the generative AI search system performs, by the one or more processors, a blender process that generates annotations for one or more of the content items in the relevancy-ranked output listing. For example, the generated annotations comprise a type of content item for a respective content item in the relevancy-ranked output listing.

In step 308, the system causes a portion of the relevancy-ranked output listing to be rendered at the client device of the user.

In step 310, the system generates a search summary indicating the content identifiers, a content description and an associated relevancy ranking value of the content items associated with the generated relevancy-ranked output.

In step 312, the system receives modifications to the relevancy ranking values indicated in the search summary. For example, the system may receive, via a user interface, a modified relevancy ranking value for one or more of the content items indicated in the search summary.

In step 314, the received modifications are then used to retrain the generative AI system with the modified ranking values. For example, the system may retrain, by the one or more processors, the one or more machine learning models with the modified relevancy rank. In some embodiments, retrained one or more machine learning models generates a different relevancy-ranked output when the search criterion is applied to the generative AI search system.

Figure 4:
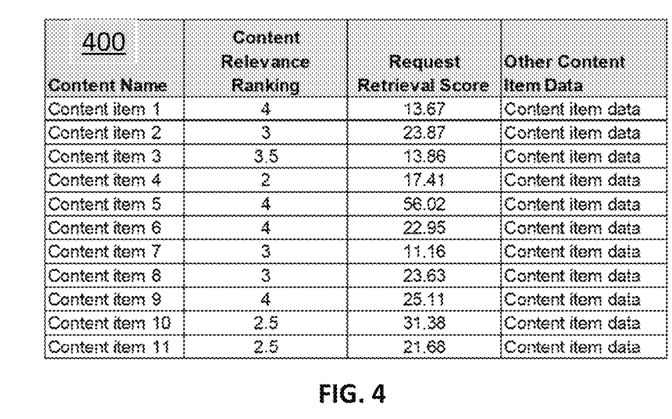
FIG. 4 is an example user interface depicting a listing of content items responsive to a user query.

FIG. 4. is a diagram illustrating an example user interface of some embodiments of the system. The system generates logs describing the results from user queries. The logs include details describing content items names (such as a content item description or a unique content item identifier), a content relevance ranking score, a request retrieval score, and other content item data. In some examples, the log includes the text of the received user input and/or the search criterion generated by the system. The system may provide for display to a client device, a portion of the generated log. In some embodiments, the user interface may receive a modification of the relevancy ranking value. The modification to the relevancy ranking values are then used to retrain one or more models of the generative AI search system to produce different search results. The feedback and retraining may be periodically performed by the system.

Figure 5:
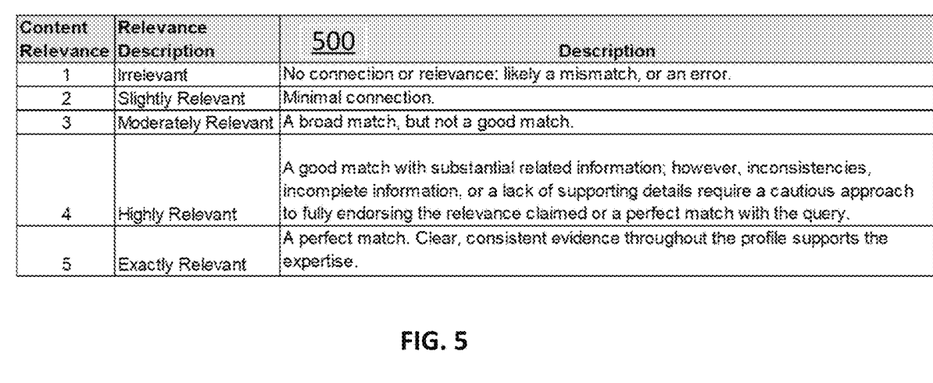
FIG. 5 is a table describing relevance value for search results of content item retrieved by the system.

FIG. 5 is a diagram illustrating a table indicating relevancy ranking values. This table describes the Content Relevance Ranking column of FIG. 4. A value of 1 of the content relevance indicates the returned content item is irrelevant to the generated search criterion. A value of 5 indicates that the returned content item is exactly relevant to the generated search criterion. The content relevance ranking is a value on a scale of 1-5 with a value of 1 indicating the least relevance and a value of 5 indicating the most relevance as to the particular content item being returned or found by the generative AI search system in response to the received user input.

Figure 6:
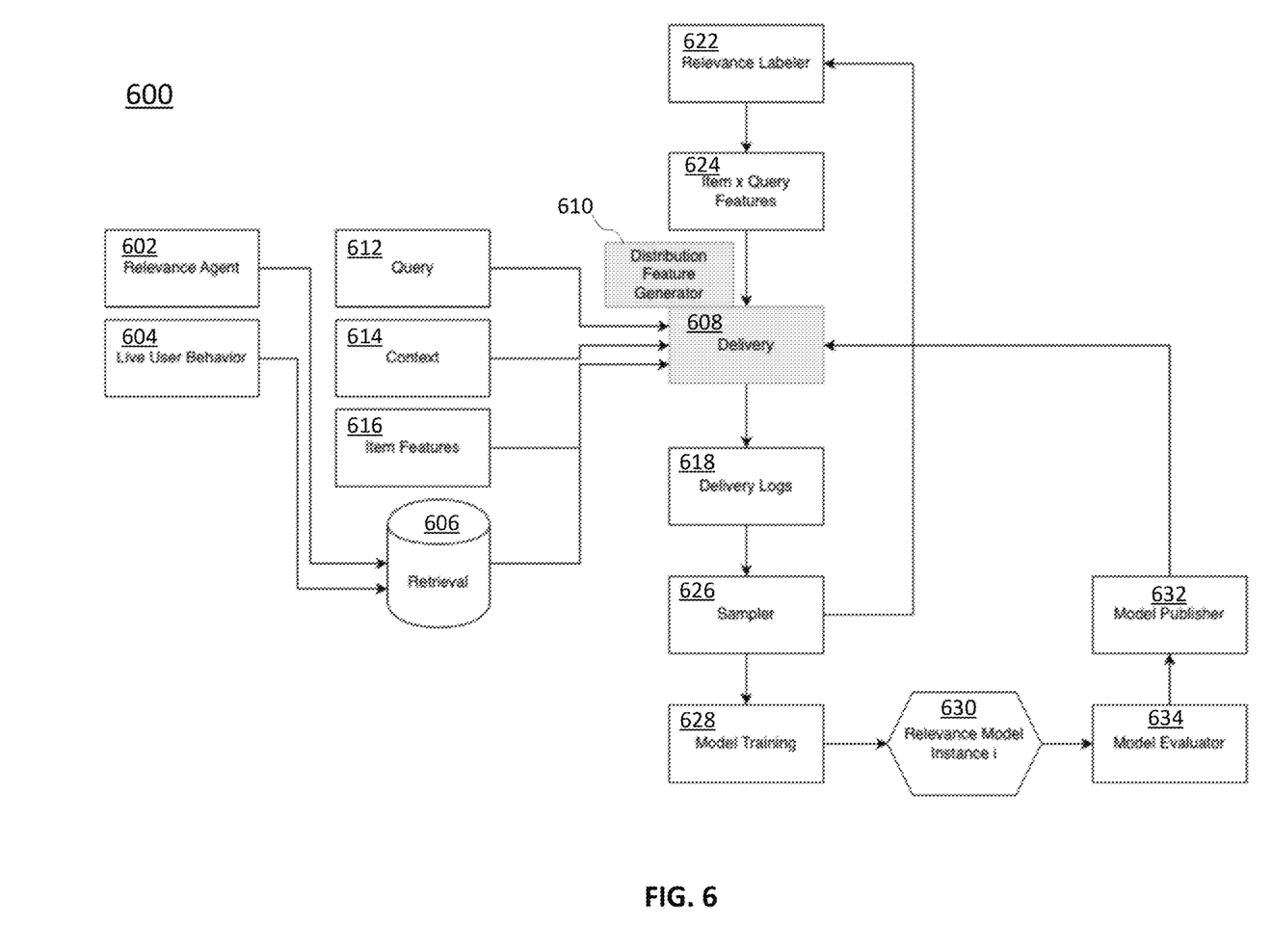
FIG. 6 is a flow chart illustrating an exemplary method that may be performed in some embodiments.

FIG. 6 is a diagram illustrating an example relevance inference and machine learning model training system feedback loop. In some embodiments, the system, using one or more processors, performs the process 600 causing machine learning model retraining of the generative AI search system.

In some embodiments, the system generates prompts to the retrieval system to retrieve sets of items for consideration for allocation. For example, the system may receive user input 604 and/or a relevance agent (or artificial intelligence agent service) 602 may create the prompts. The Retrieval system 606 (such as the generative AI search system described with regard to FIGS. 2A-2B) searches for and generates one or more content item sets that are responsive to the prompts.

The system 600 then causes the one or more content item sets to be input to and processed by a Delivery allocator system 608. The information input into the Delivery allocation system 680 may include information about a query 612, the query context 614, content item features 616616 (such as content item descriptions, content names, content identifiers, etc.).

A content item Feature Distribution Generator 610 generates features about how the content items relate to each other. For content those items considered for allocation, the system generates one or more Delivery Logs 618. The Delivery Logs 168 may be file files, databases or other data structures stored on a storage media and/or in a memory of the computer system. The Delivery Logs 618 include the context, the items considered and allocated, and all features available for use in allocation decisions and machine learning models.

The system 600 then executes a Sampler that samples some Delivery Logs 618 that are to be labeled for contextual relevance by a rater 622. These ratings are saved in an Item×Query 624 datastore which may be available for future use in Delivery 608 for future allocation requests with the same (item×query) pair or joined to Delivery Logs 618. The relevance labels, combined with the Delivery Log 618 information either in Delivery 608 or in an offline joining job, generate supervised semantic relevance training examples for the Model Training system 628. The Model Training system may include one or more machine learning models. Each periodic execution of the Modeling Training system 628 generates a new Relevance Model Instance (i) 630. The system 600 performs a Model Evaluator 634 process that evaluates the the new Relevance Model Instance (i) 630 and to determine whether the instance of the new Relevance Model checks for usability (such as quality checks on the model) of the new Relevance Model Instance (i) 630. The system 600 performs a Model Publisher 632 process that publishes the new Relevance Model Instance (i) to the Delivery 608 system to replace any existing previous Relevance model instance of the same type for use in making allocation decisions.

Figure 7:
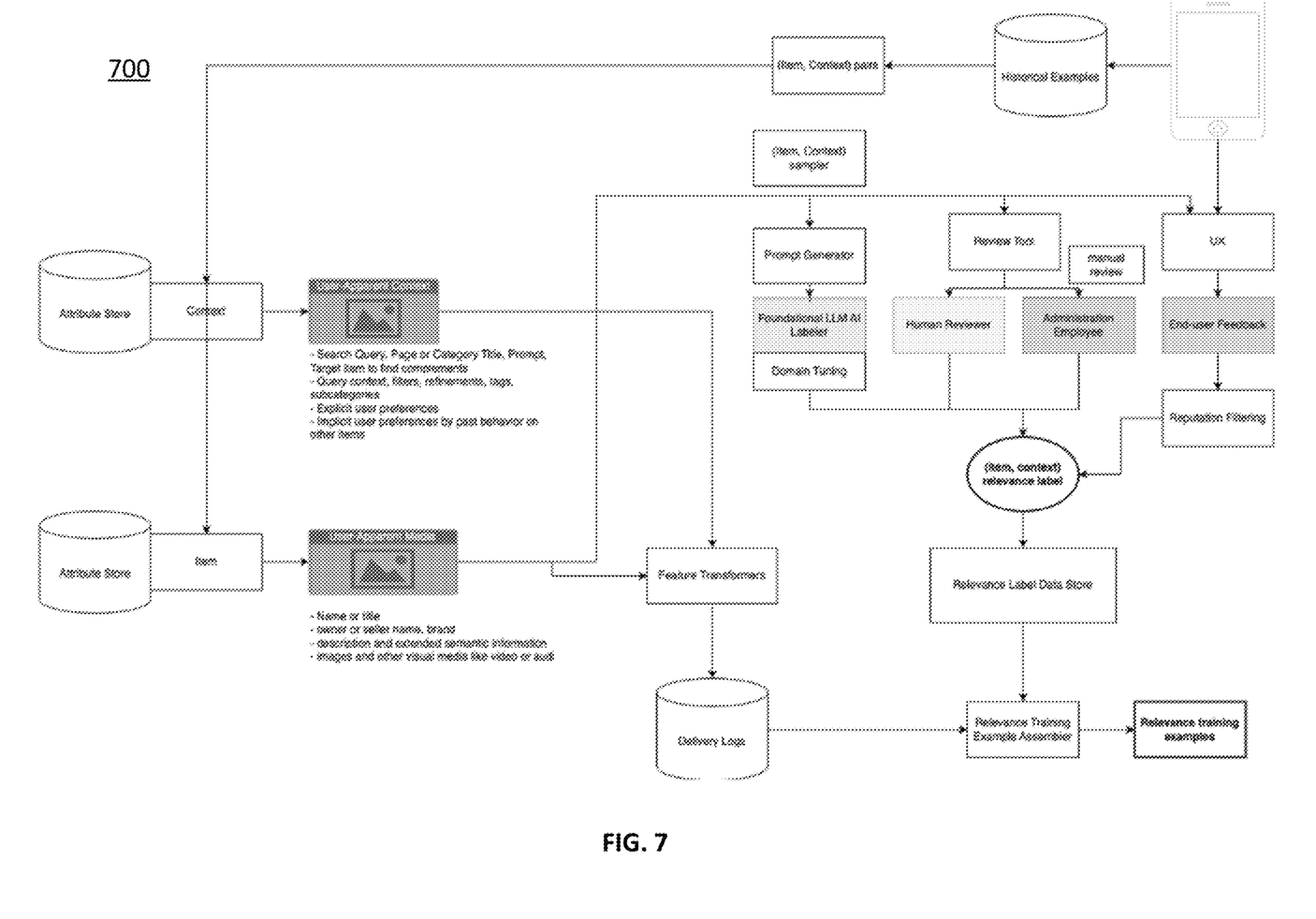
FIG. 7 is a diagram illustrating an exemplary method using an exemplary computer system.

FIG. 7 is a diagram illustrating an example relevance labeling system 700. The system 700, using one or more processors, generates labels by any combination of manual entry by human reviewers, end user feedback, and artificial intelligence processing. The resulting labels by all methods are processed so that they are interchangeable, although there may be some order of priority for reliability that prefers, for example, administrative employee labels over label generated by artificial intelligence processing and end user labels.

Relevance labels may be generated from content readily visible by end users (such as text, images, video, audio, and obviously apparent representation of important attributes like queries, target product, page or category title, price, tags, and any other information that an end user would use to judge an item "apparently relevant" to an "apparent" context.

In the relevant-to-user context, the context may include information "apparent" to the end user, like their explicit preferences and implicit preferences identified by past behavior, like recent past purchases or other items "in a shopping cart." "Apparent" information is in contrast to non-apparent information, like past historical engagement. This apparent media is directly presented to relevance raters using a rater-appropriate transformation and display (LLM prompt, admin tool, end-user user interface). Apparent media is transformed into appropriate training of one or more of the systems' machine learning models.

Figure 8:
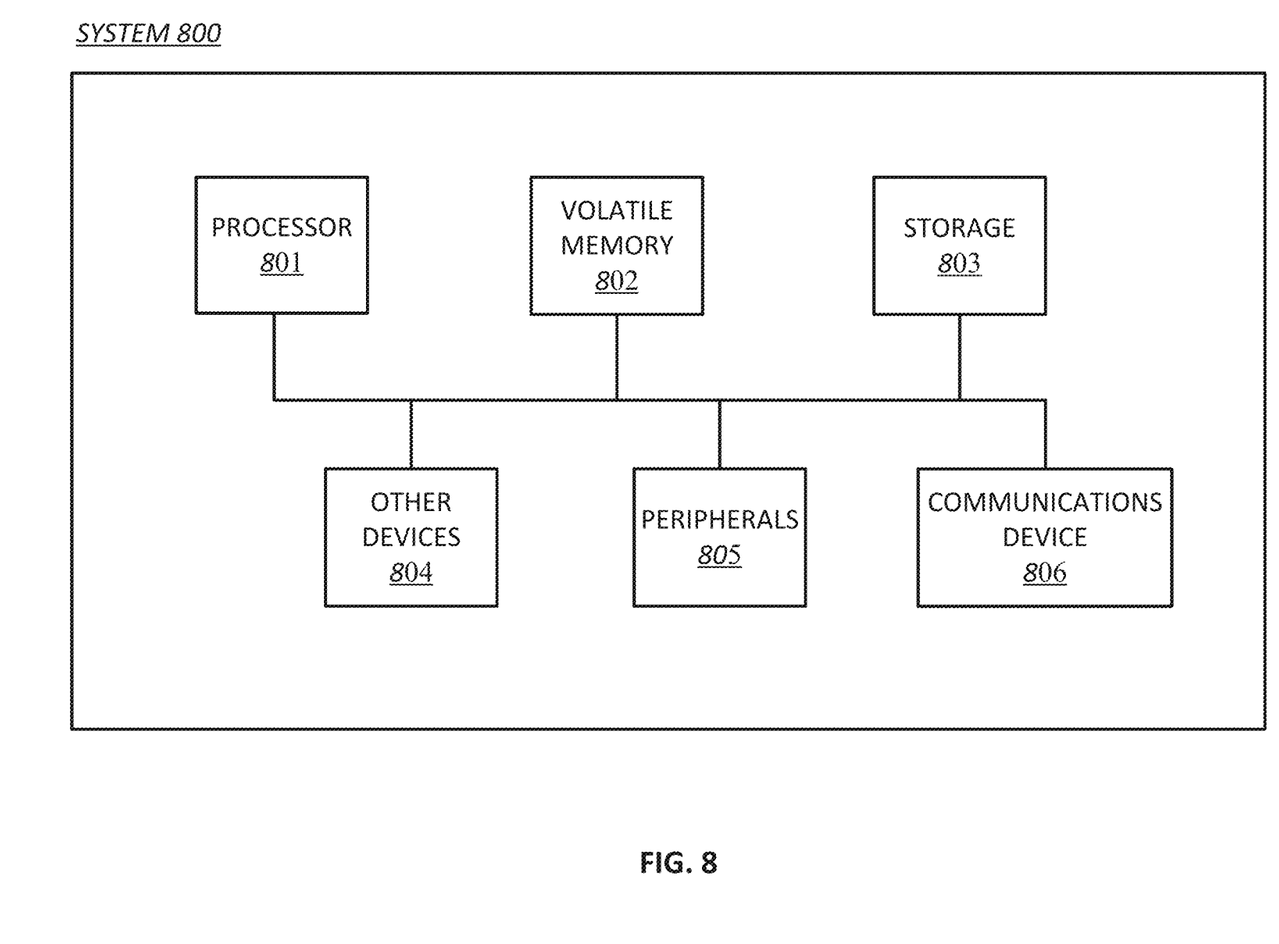
FIG. 8 is a diagram illustrating an exemplary computer that may perform processing in some embodiments.

FIG. 8 is a diagram illustrating an exemplary computer that may perform processing in some embodiments. Exemplary computer 800 may perform operations consistent with some embodiments. The architecture of computer 800 is exemplary. Computers can be implemented in a variety of other ways. A wide variety of computers can be used in accordance with the embodiments herein.

Processor 801 may perform computing functions such as running computer programs. The volatile memory 802 may provide temporary storage of data for the processor 801. RAM is one kind of volatile memory. Volatile memory typically requires power to maintain its stored information. Storage 803 provides computer storage for data, instructions, and/or arbitrary information. Non-volatile memory, which can preserve data even when not powered and including disks and flash memory, is an example of storage. Storage 803 may be organized as a file system, database, or in other ways. Data, instructions, and information may be loaded from storage 803 into volatile memory 802 for processing by the processor 801.

The computer 800 may include peripherals 805. Peripherals 805 may include input peripherals such as a keyboard, mouse, trackball, video camera, microphone, and other input devices. Peripherals 805 may also include output devices such as a display. Peripherals 805 may include removable media devices such as CD-R and DVD-R recorders/players. Communications device 806 may connect the computer 800 to an external medium. For example, communications device 806 may take the form of a network adapter that provides communications to a network. A computer 800 may also include a variety of other devices 804. The various components of the computer 800 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

Example set. It will be appreciated that the present disclosure may include any one and up to all of the following examples:

Example 1. A computer-implemented method performed by one or more processors, comprising the operations of: receiving a natural language-based input associated with a client device of a user; generating, by the one or more processors, a search criterion for the received natural language-based input; generating, by the one or more processors, a relevancy-ranked output of content items, wherein generating the relevancy-ranked output comprises: causing the generated search criterion to be processed, via a generative AI search system, comprising one more machine learning models; generating by the generative AI search system, a relevancy-ranked output listing content items responsive to the generated search criterion, wherein the content items have a content identifier and a content description; and causing a portion of the relevancy-ranked output listing to be rendered at the client device of the user; and generating a search summary indicating the content identifiers, the content description and an associated relevancy ranking value of the content items associated with the generated relevancy-ranked output.

Example 2. The computer-implemented method of Example 1, further comprising the operations of: receiving, via a user interface, a modified relevancy ranking value for one or more of the content items indicated in the search summary; and retraining, by the one or more processors, the one or more machine learning models with the modified relevancy rank.

Example 3. The computer-implemented of any one of Examples 1-2, wherein the retrained one or more machine learning models generates a different relevancy-ranked output when the search criterion is applied to the generative AI search system.

Example 4. The computer-implemented method of any one of Examples 1-3, wherein causing the generated search criterion to be processed, via a search system, comprises the operations of: performing, by the one or more processors, a first stage scoring process, to generate a set of content items; and performing, by the one or more processors, a second stage scoring process, by processing the set of content items by an inferencing machine learning model trained to determine item score values; and generating, by the inferencing machine learning model, item score values for the set of content items.

Example 5. The computer-implemented method of any one of Examples 1-4, further comprising the operations of: performing, by the one or more processors, a third stage scoring process that modifies an item score value to adjust a content item position placement in the relevancy-ranked output listing.

Example 6. The computer-implemented method of any one of Examples 1-5, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

Example 7. The computer-implemented method of any one of Examples 1-6, wherein the first stage scoring process comprises: generating, by the one or more processors, a search vector embedding of the received input; performing a vector similarity matching of the search vector embedding as to a set of vector embeddings describing the content items; and generating a listing of those content items where a similarity threshold match value is met or exceeded.

Example 8. A system comprising one or more processors configured to perform the operations of: receiving a natural language-based input associated with a client device of a user; generating, by the one or more processors, a search criterion for the received natural language-based input; generating, by the one or more processors, a relevancy-ranked output of content items, wherein generating the relevancy-ranked output comprises: causing the generated search criterion to be processed, via a generative AI search system, comprising one more machine learning models; generating by the generative AI search system, a relevancy-ranked output listing content items responsive to the generated search criterion, wherein the content items have a content identifier and a content description; and causing a portion of the relevancy-ranked output listing to be rendered at the client device of the user; and generating a search summary indicating the content identifiers, the content description and an associated relevancy ranking value of the content items associated with the generated relevancy-ranked output.

Example 9. The system of Example 8, further comprising the operations of: receiving, via a user interface, a modified relevancy ranking value for one or more of the content items indicated in the search summary; and retraining, by the one or more processors, the one or more machine learning models with the modified relevancy rank.

Example 10. The system of any one of Examples 8-9, wherein the retrained one or more machine learning models generates a different relevancy-ranked output when the search criterion is applied to the generative AI search system.

Example 11. The system of any one of Examples 8-10, wherein causing the generated search criterion to be processed, via a search system, comprises: performing, by the one or more processors, a first stage scoring process, to generate a set of content items; and performing, by the one or more processors, a second stage scoring process, by processing the set of content items by an inferencing machine learning model trained to determine item score values; and generating, by the inferencing machine learning model, item score values for the set of content items.

Example 12. The system of any one of Examples 8-11, further comprising the operations of: performing, by the one or more processors, a third stage scoring process that modifies an item score value to adjust a content item position placement in the relevancy-ranked output listing.

Example 13. The system of any one of Examples 8-12, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

Example 14. The system of any one of Examples 8-13, wherein the first stage scoring process comprises: generating, by the one or more processors, a search vector embedding of the received input; performing a vector similarity matching of the search vector embedding as to a set of vector embeddings describing the content items; and generating a listing of those content items where a similarity threshold match value is met or exceeded.

Example 15. A non-transitory computer readable medium storing a software program comprising data and computer implementable instructions that when executed by at least one processor cause the at least one processor to perform operations of: receiving a natural language-based input associated with a client device of a user; generating, by the one or more processors, a search criterion for the received natural language-based input; generating, by the one or more processors, a relevancy-ranked output of content items, wherein generating the relevancy-ranked output comprises: causing the generated search criterion to be processed, via a generative AI search system, comprising one more machine learning models; generating by the generative AI search system, a relevancy-ranked output listing content items responsive to the generated search criterion, wherein the content items have a content identifier and a content description; and causing a portion of the relevancy-ranked output listing to be rendered at the client device of the user; and generating, by the one or more processors, a search summary indicating the content identifiers, the content description and an associated relevancy ranking value of the content items associated with the generated relevancy-ranked output.

Example 16. The non-transitory computer readable medium of Example 15, further comprising the operations of: receiving, via a user interface, a modified relevancy ranking value for one or more of the content items indicated in the search summary; and retraining, by the one or more processors, the one or more machine learning models with the modified relevancy rank.

Example 17. The non-transitory computer readable medium of any one of Examples 15-16, wherein the retrained one or more machine learning models generates a different relevancy-ranked output when the search criterion is applied to the generative AI search system.

Example 18. The non-transitory computer readable medium of any one of Examples 15-17, wherein causing the generated search criterion to be processed, via a search system, comprises: performing, by the one or more processors, a first stage scoring process, to generate a set of content items; and performing, by the one or more processors, a second stage scoring process, by processing the set of content items by an inferencing machine learning model trained to determine item score values; and generating, by the inferencing machine learning model, item score values for the set of content items.

Example 19. The non-transitory computer readable medium of any one of Examples 15-18, further comprising the operations of: performing, by the one or more processors, a third stage scoring process that modifies an item score value to adjust a content item position placement in the relevancy-ranked output listing.

Example 20. The non-transitory computer readable medium of any one of Examples 15-19, further comprising the operations of: performing, by the one or more processors, a blender process that generates annotations for one or more of the content items in the relevancy-ranked output listing, wherein the generated annotations comprise a type of content item for a respective content item in the relevancy-ranked output listing.

Example 21. The non-transitory computer readable medium of any one of Examples 15-20, wherein the first stage scoring process comprises: generating, by the one or more processors, a search vector embedding of the received input; performing a vector similarity matching of the search vector embedding as to a set of vector embeddings describing the content items; and generating a listing of those content items where a similarity threshold match value is met or exceeded.

What is claimed is:

1. A computer-implemented method performed by one or more processors, comprising the operations of:
    receiving a natural language-based input associated with a client device of a user;
    generating, by the one or more processors, a search criterion for the received natural language-based input;
    generating, by the one or more processors, a relevancy-ranked output of content items, wherein generating the relevancy-ranked output comprises:
        causing the generated search criterion to be processed, via a generative Artificial Intelligence (AI) search system, comprising one or more machine learning models;
        generating by the generative AI search system, a relevancy-ranked output listing content items responsive to the generated search criterion, wherein the content items have a content identifier and a content description; and
        causing a portion of the relevancy-ranked output listing to be rendered at the client device of the user;
    generating, by the one or more processors, a search summary indicating the content identifiers, the content description and an associated relevancy ranking value of the content items associated with the generated relevancy-ranked output;
    receiving, via a user interface, a modified relevancy ranking value for one or more of the content items indicated in the search summary, wherein a relevancy ranking value is based on a scale of multiple numeric relevancy ranking values, wherein one ranking value on the scale indicates that a content item is irrelevant to the generated search criterion, wherein another ranking value on the scale indicates that a content item is exactly relevant to the generated search criterion, and wherein the user interface displays multiple content items and the generated search criterion; and
    retraining, by the one or more processors, the one or more machine learning models with the received modified relevancy ranking value, wherein the retrained one or more machine learning models generates a different relevancy-ranked output when the search criterion is applied to the generative AI search system.

2. The computer-implemented method of 1, wherein causing the generated search criterion to be processed, via a search system, comprises the operations of
    performing, by the one or more processors, a first stage scoring process, to generate a set of content items; and
    performing, by the one or more processors, a second stage scoring process, by processing the set of content items by an inferencing machine learning model trained to determine item score values; and
    generating, by the inferencing machine learning model, item score values for the set of content items.

3. The computer-implemented method of claim 2, further comprising the operations of:
    performing, by the one or more processors, a third stage scoring process that modifies an item score value to adjust a content item position placement in the relevancy-ranked output listing.

4. The computer-implemented method of claim 2, further comprising the operations of:
    performing, by the one or more processors, a blender process that generates annotations for one or more of the content items in the relevancy-ranked output listing, wherein the generated annotations comprise a type of content item for a respective content item in the relevancy-ranked output listing.

5. The computer-implemented method of claim 2, wherein the first stage scoring process comprises:
    generating, by the one or more processors, a search vector embedding of the received input;
    performing a vector similarity matching of the search vector embedding as to a set of vector embeddings describing the content items; and
    generating a listing of those content items where a similarity threshold match value is met or exceeded.

6. A system comprising one or more processors configured to perform the operations of:
    receiving a natural language-based input associated with a client device of a user;
    generating, by the one or more processors, a search criterion for the received natural language-based input;
    generating, by the one or more processors, a relevancy-ranked output of content items, wherein generating the relevancy-ranked output comprises:
        causing the generated search criterion to be processed, via a generative Artificial Intelligence (AI) search system, comprising one or more machine learning models;

generating by the generative AI search system, a relevancy-ranked output listing content items responsive to the generated search criterion, wherein the content items have a content identifier and a content description; and causing a portion of the relevancy-ranked output listing to be rendered at the client device of the user;

generating, by the one or more processors, a search summary indicating the content identifiers, the content description and an associated relevancy ranking value of the content items associated with the generated relevancy-ranked output;

receiving, via a user interface, a modified relevancy ranking value for one or more of the content items indicated in the search summary, wherein a relevancy ranking value is based on a scale of multiple numeric relevancy ranking values, wherein one ranking value on the scale indicates that a content item is irrelevant to the generated search criterion, wherein another ranking value on the scale indicates that a content item is exactly relevant to the generated search criterion, and wherein the user interface displays multiple content items and the generated search criterion; and retraining, by the one or more processors, the one or more machine learning models with the received modified relevancy ranking value, wherein the retrained one or more machine learning models generates a different relevancy-ranked output when the search criterion is applied to the generative AI search system.

7. The system of claim 6, wherein causing the generated search criterion to be processed, via a search system, comprises:

performing, by the one or more processors, a first stage scoring process, to generate a set of content items; and performing, by the one or more processors, a second stage scoring process, by processing the set of content items by an inferencing machine learning model trained to determine item score values; and generating, by the inferencing machine learning model, item score values for the set of content items.

8. The system of claim 7, further comprising the operations of:

performing, by the one or more processors, a third stage scoring process that modifies an item score value to adjust a content item position placement in the relevancy-ranked output listing.

9. The system of claim 7, further comprising the operations of:

performing, by the one or more processors, a blender process that generates annotations for one or more of the content items in the relevancy-ranked output listing, wherein the generated annotations comprise a type of content item for a respective content item in the relevancy-ranked output listing.

10. The system of claim 7, wherein the first stage scoring process comprises:

generating, by the one or more processors, a search vector embedding of the received input;

performing a vector similarity matching of the search vector embedding as to a set of vector embeddings describing the content items; and generating a listing of those content items where a similarity threshold match value is met or exceeded.

11. A non-transitory computer readable medium storing a software program comprising data and computer implementable instructions that when executed by at least one processor cause the at least one processor to perform operations receiving a natural language-based input associated with a client device of a user;

generating, by the one or more processors, a search criterion for the received natural language-based input;

generating, by the one or more processors, a relevancy-ranked output of content items, wherein generating the relevancy-ranked output comprises:

causing the generated search criterion to be processed, via a generative Artificial Intelligence (AI) search system, comprising one or more machine learning models;

generating by the generative AI search system, a relevancy-ranked output listing content items responsive to the generated search criterion, wherein the content items have a content identifier and a content description; and causing a portion of the relevancy-ranked output listing to be rendered at the client device of the user; and generating a search summary indicating the content identifiers, the content description and an associated relevancy ranking value of the content items associated with the generated relevancy-ranked output;

receiving, via a user interface, a modified relevancy ranking value for one or more of the content items indicated in the search summary, wherein a relevancy ranking value is based on a scale of multiple numeric relevancy ranking values, wherein one ranking value on the scale indicates that a content item is irrelevant to the generated search criterion, wherein another ranking value on the scale indicates that a content item is exactly relevant to the generated search criterion, and wherein the user interface displays multiple content items and the generated search criterion; and retraining, by the one or more processors, the one or more machine learning models with the received modified relevancy ranking value, wherein the retrained one or more machine learning models generates a different relevancy-ranked output when the search criterion is applied to the generative AI search system.

12. The non-transitory computer readable medium of claim 11, wherein causing the generated search criterion to be processed, via a search system, comprises:

performing, by the one or more processors, a first stage scoring process, to generate a set of content items; and performing, by the one or more processors, a second stage scoring process, by processing the set of content items by an inferencing machine learning model trained to determine item score values; and generating, by the inferencing machine learning model, item score values for the set of content items.

13. The non-transitory computer readable medium of claim 12, further comprising the operations of performing, by the one or more processors, a third stage scoring process that modifies an item score value to adjust a content item position placement in the relevancy-ranked output listing.

14. The non-transitory computer readable medium of claim 12, further comprising the operations of:

performing, by the one or more processors, a blender process that generates annotations for one or more of the content items in the relevancy-ranked output listing, wherein the generated annotations comprise a type of content item for a respective content item in the relevancy-ranked output listing.

15. The non-transitory computer readable medium of claim 12, wherein the first stage scoring process comprises:

generating, by the one or more processors, a search vector embedding of the received input;

performing a vector similarity matching of the search vector embedding as to a set of vector embeddings describing the content items; and generating a listing of those content items where a similarity threshold match value is met or exceeded.

* * * * *